United States Patent Office 3,200,003
Patented Aug. 10, 1965

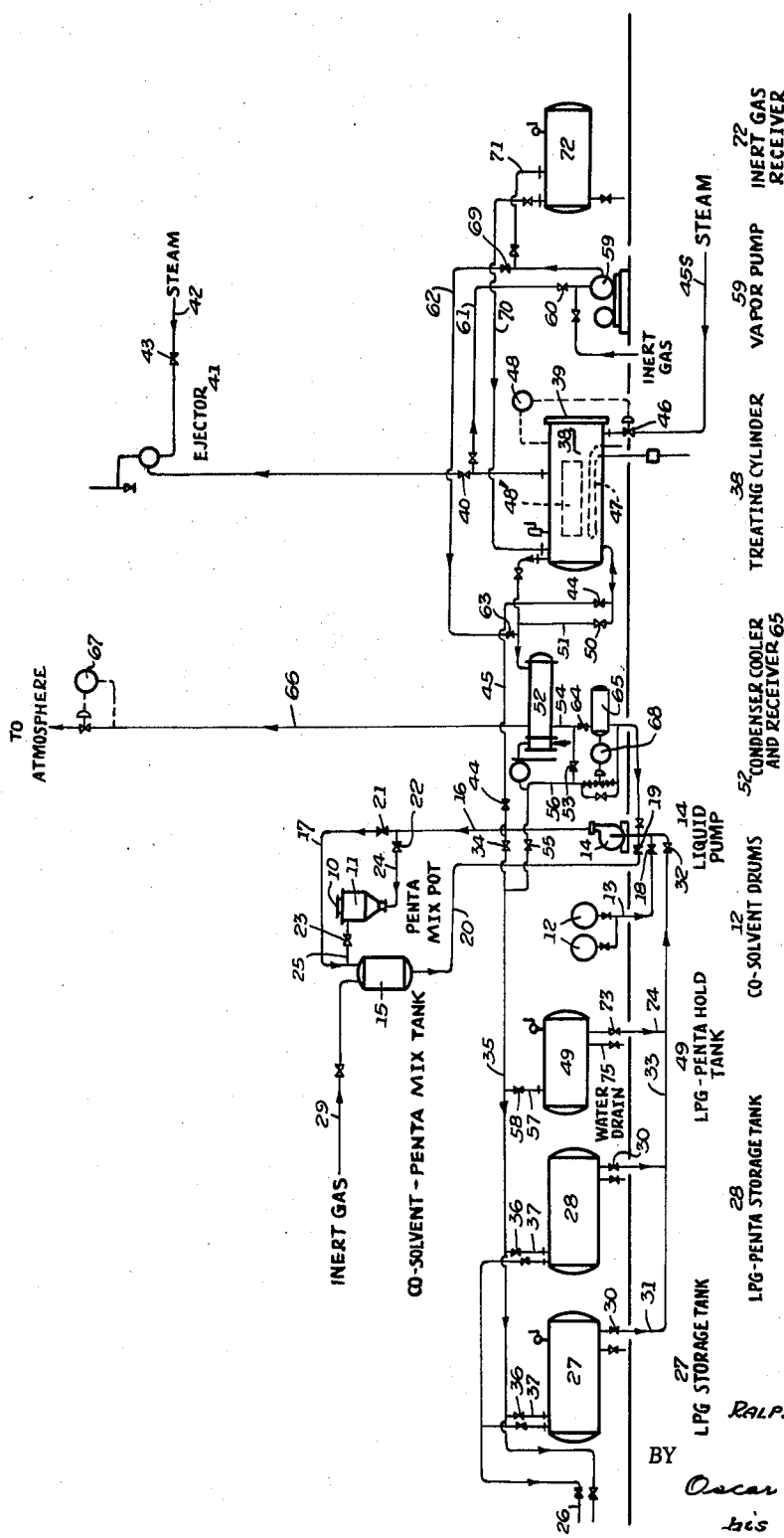

3,200,003
PROCESS FOR IMPREGNATING WOOD WITH PENTACHLOROPHENOL AND COMPOSITION THEREFOR
Ralph H. Bescher, Pittsburgh, Pa., assignor to Koppers Company, Inc., a corporation of Delaware
Filed Jan. 11, 1962, Ser. No. 165,559
14 Claims. (Cl. 117—59)

This application is a continuation-in-part of my copending application Serial No. 822,067 filed June 22, 1959, now abandoned.

The present invention relates in general to a process and apparatus for impregnating wood and other porous materials with impregnants for preservative treatment, deposit of dyes, water repellents, and other compounds such as pentachlorophenol and other preservative chemicals, by the well-known full and empty cell methods, and more specifically, to process and apparatus for carrying out such impregnation using solvent vehicles that are normally gaseous at operating temperatures and atmospheric pressure and that are readily liquefiable at operating temperatures under elevated pressure above atmospheric.

More particularly, the invention is directed to carrying out such impregnation of wood and other porous materials with pentachlorophenol, which is carried into the wood or other porous material as solution in solvent vehicles of aliphatic hydrocarbons such as propane, n-butane, iso-butane, n-pentane, iso-pentane, or mixtures of said vehicles, and especially the butanes, propane, or mixtures of these two.

These solvents are selected on the basis that they can be heated to a sufficient temperature, without exceeding the maximum pressure limits of treating specifications, so that the heat contained in the solvents together with the heat transferred to the wood is sufficient to cause complete evaporation of the solvent contained in the wood at the conclusion of the treating cycle.

In normal treatments of wood to provide protection against fungus or termite attack, it is customary to use as an impregnating solution mixtures of liquid aromatic hydrocarbons, such as creosote, mixtures of inorganic salts which are dissolved in water, or certain solid organic compounds which are dissolved in petroleum distillates.

Each of these types of impregnating solutions has certain inherent disadvantages. Liquid aromatic hydrocarbons impart to the wood strong odors and leave the wood with a surface which is for practical purposes very oily and difficult to paint. Wood treated with salts dissolved in water is expanded dimensionally due to the interaction of the water with the cellulose of the wood. This is partially overcome by kiln drying or prolonged air seasoning after treatment, but such drying results in degrade due to distortion, grain raising, and the like. Wood treated with organic preservatives dissolved in petroleum distillates have the same disadvantages as wood treated with the aromatic hydrocarbons. Using lower boiling petroleum distillates, such as mineral spirits, as the solvent, fails to eliminate the disadvantages completely. Several months of air seasoning after treatment are frequently required to permit sufficient evaporation of the solvent if the wood is to be painted. During this period of air seasoning a portion of the preservative can move to the surface of the wood with the solvent, thus the retention of preservative in the wood is reduced below that contemplated by (calculated during) the treatment. If the wood is shipped from the treating plant without air seasoning, it is necessary that each layer be separated from adjacent layers, otherwise sweating of the solvent between layers occurs and the wood would be received at its destination with oily surfaces.

The primary object of this invention is to overcome the disadvantages of using solutions as mentioned above. Wood processed in accordance with this invention is removed from the cylinder dimensionally unchanged, odorless, and with non-oily surfaces. There is no subsequent loss of preservative due to solvent movement towards the surface. Air storage or kiln drying it not required.

Many years ago, it was proposed to overcome these same disadvantages employing as a preservative carrier dimethyl ether, a normally gaseous media that is liquefied at ambient temperatures under pressure above atmospheric. A full cell process was proposed and this led to high preservative injections. The major disadvantage of this process was the fact that the vapor pressure of dimethyl ether increased very rapidly with small increases in temperature, and if sufficient temperature was used to store enough heat in the wood to evaporate the dimethyl ether injected, then cylinder pressures above those recommended and permitted by specifications developed resulting in damage to the wood by pressure. In addition, water contained in wood has appreciable solubility in dimethyl ether and such water that would dissolve in the solvent could not be separated without fractionation. This would strip the preservative out of the solvent, creating a considerable loss.

In accordance with this invention, it has been found that wood may be impregnated with a preservative without changing the dimensions or the surface texture of the wood by impregnating the wood with a preservative which is in solution in an aliphatic hydrocarbon solvent which (a) boils below the boiling point of water at ambient atmospheric pressure and (b) readily liquefies at ambient atmospheric temperatures when placed under elevated pressure and which solvent contains additionally a cosolvent to assist the preservative into solution, said cosolvent having (a) less than 10 percent water solubility, (b) greater than 25 percent solubility for the preservative to be dissolved therein and (c) a solubility in the solvent used as the carrier for the preservative.

In accordance with the present invention, the solvents for the wood impregnants are selected on the basis that they can be heated to temperatures sufficient to store enough heat within themselves and within the wood, without exceeding 200° F. and without developing vapor pressures in excess of 200 pounds per square inch, so that the amount of solvent injected during the processing will be essentially self-evaporating when a vacuum is drawn on the cylinder containing the treated wood.

When solvents which have a relatively high boiling point at atmospheric pressure are used, it is desirable to use an empty cell process for treating, so as to reduce the injection and create a kickback of the preservative at the conclusion of the pressure phase, thus reducing the quantity of solvent which must be self-evaporating. The non-soluble, non-condensable gas used in such empty cell process may be air, but preferably, nitrogen or other noncombustible gas, due to the burnable characteristic of most solvents used. Such empty cell process may also be employed for treating, even though the vapor pressure characteristic of the solvent used lends itself to a full cell process.

Because of their desirable vapor pressure characteristics, availability, and economy, such solvents as liquefied petroleum gas, liquefied propane, butane, iso-butane, etc. are particularly recommended. A cosolvent, miscible with the carrier medium and differing in its molecular structure from said liquefied petroleum gas, etc., is utilized to introduce the impregnant into the solvent medium in the proportions required for treatment of the wood.

The solubility characteristics of the solvent for the pentachlorophenol which is used to impregnate wood according to the process of this invention are extremely important to the successful penetration and retention of the impregnant into the wood. If the pentachlorophenol is not soluble to an extent that the carrier solvent is able to inject the pentachlorophenol into the wood in sufficient quantity and depth, then the desirable preservative characteristics of the impregnated wood will be lacking. In this respect, the aliphatic hydrocarbon solvents useful in this invention are unable to dissolve pentachlorophenol to the extent necessary for proper impregnation of wood. It is critical, therefore, that if pentachlorophenol is to be dissolved in the aliphatic hydrocarbon carrier solvents of this invention, that there be present a cosolvent in the carrier medium to assist the impregnant into solution.

The choice of cosolvents is also critical and depends upon solubility of the cosolvent in water, the solubility of the preservative in the cosolvent, and the solubility of the cosolvent in the carrier solvent. If the cosolvent has greater than 10 percent water solubility, it will react with the free water in the wood, that is, it will go into solution with the water to a greater extent than it will with the liquefied petroleum gas carrier. If this occurs, part of the pentachlorophenol or other preservative which has been dissolved in the cosolvent will also enter into solution with the water and when the water of the wood is removed during the treating process, the pentachlorophenol dissolved therein will also drain off. If the cosolvent has less than about 25 percent solubility for the preservative to be dissolved therein, an excess amount of cosolvent would be necessary to assist the pentachlorophenol into solution making the process economically unattractive and at the same time reducing the efficiency and capability of the carrier solvent to take the preservative into the wood. It is also critical that the cosolvent be soluble in the aliphatic hydrocarbon carrier solvent so that whatever amount of preservative is dissolved in the cosolvent will also be contained in the primary carrier solvent.

Cosolvents which have been successfully used in the novel process of this invention include such compounds as toluene, benzene, nitrobenzene, di- and tri-chlorobenzenes, alkyl benzenes, hydroxybenzenes, xylene, ethyl ether, isopropyl ether, vinyl ethyl ether, dibutyl ether, dibutyl ketone, diisobutyl ketone, methylisobutyl ketone, benzonitrile, decalin, tetralin, butyraldehyde, isobutyraldehyde.

The impregnating solution for carrying out the novel process of this invention, for example, comprises from about 2 to 6 percent solution of pentachlorophenol in liquefied petroleum gas and isopropyl ether cosolvent, and preferably a five percent solution. Solutions containing less than about 2 percent by weight of the pentachlorophenol do not impart in all cases a sufficient retention of the preservative in the wood being subjected to the process. For example, the American Wood-Preservers' Association specifies that plywood shall have complete penetration of the specimens with a minimum retention of .3 pound per cubic foot. Using the solution range of this process, these minimum requirements are readily obtainable. It has been found also that the cosolvent used in the solution should comprise about 2 to 8 percent of the total solution. If less than 2 percent of cosolvent is used, sufficient pentachlorophenol could not be dissolved in the carrier solvent to result in adequate treatment. If greater than 8 percent of the cosolvent is used, no appreciable advantage is obtained and the use of more cosolvent would be economically unattractive.

The pressure necessary for treatment of wood and like porous objects is readily obtained by heating the treating solution while it is in the treating cylinder impregnating the wood therein when such solvents as propane, butane, and iso-butane are used. In this manner, the actual vapor pressure of the solution is increased to give the required pressure for wood or other treatment. Resort to pressure applied from external sources, as by either a pressure pump or gas compressors, is necessary when solvent mediums, such as pentane or iso-pentane, are used, or when high volumetric injections are desired.

Because the solvent is evaporated easily while the wood is still in the treating cylinder, "blooming" does not occur in service, and so, the treatment of the wood is more durable than other light solvent formulations.

Water repellent chemicals soluble in hydrocarbons may also be added to the formulations, for example wax or paraffin.

To summarize, the advantages of the invention are:

The treated product is immediately free of liquid carrier, and of odor.

The treatment does not cause warping, checking or splitting.

It does not cause grain raising, so finished or semi-finished wood may be treated.

Storage area and time for the treated wood is greatly reduced, so that the freshly treated wood may be used sooner, and as soon as it is delivered to the job site.

Special air drying or kiln seasoning prior to use for the purpose of removing the solvent is not required.

The treatment can be accomplished within a minimum of time. The extremely low viscosity of liquefied petroleum gas, and the fact that no lengthy pre- or post-treating processing is required, lowers the cost by increasing the throughput.

The fact that the carrier may be recovered and reused lowers the cost.

Woods treated according to this process have a permanent retention of preservative, thus increasing their useful life.

There is no damage to the strength of good due to high heat.

During the process of this invention, pentachlorophenol, which has been dissolved in the liquefied gas carrier and cosolvent, is forced deep into the wood fibers using the pressure treating cycle described herein. Upon releasing the pressure, the liquefied gas rapidly evaporates leaving crystalline pentachlorophenol completely penetrated into and retainer within the fibers of the wood. A final vacuum period recovers the liquefied vapors leaving the impregnated wood free of solvent.

The novel process of this invention, because of the complete expulsion of the solvent therefrom once the preservative has been forced into the wood, has the enhanced characteristic of a permanent retention of the preservative. This characteristic is necessary so that the treated woods will be effective against decay and insect attack during their years of service. Tests designed to study the permanence of treatments of wood made using a light solvent carrier have shown that pentachlorophenol when dissolved in the conventional low boiling petroleum solvents will bloom or leach to the surface of the wood over a period of time, thus reducing the protective life of the preservative. The preservative in wood which has been impregnated with low boiling petroleum solvent is carried out of the wood by the solvent, causing a translocation of the pentachlorophenol. In a report to the American Wood Preserving Association in 1953 entitled Recovery of Solvents From Wood Pressure Treated With Oil Borne Preservatives and its Effects on Paintability, Dr. M. S. Hudson concluded that the presence of solvent is the culprit causing migration and loss of pentachlorophenol and that without any solvent present, the preservative tends to remain fixed. Since wood impregnated according to the process of this invention has no solvent present to evaporate, translocation of the preservative cannot occur. As a measure of the permanence of crystalline pentachlorophenol deposited in wood according to this novel process, a portion of a completely impregnated southern yellow pine pole was ground to sawdust. The sawdust was then placed into a dry Petri dish and heated in an oven at 150° F. for 70 days. Analysis of the softwood before and after this exposure showed that less than 10 percent of the pentachlorophenol was lost.

Inasmuch as the vapor pressure of pentachlorophenol at 150° F. is one hundred times greater than it is at room temperature, a similar test, if conducted at 68° F., would necessitate an exposure period of 20 years to show a comparable loss of pentachlorophenol.

Either a full cell or an empty cell process may be used for impregnating the wood, but often times it is desirable to use an empty cell process as some solvent is removed from the wood by the expansion of the non-condensable gases, thus less heat is required to carry out the volatilization of the remaining solvent. However, with the use of an inert gas and proper manipulations of pressures with empty cell process, the retention of liquefied petroleum gas in the wood is reduced, and thus complete evaporation of the remaining liquefied petroleum gas in the wood is effected by the heat stored in the wood.

Compressed air may be used as the non-condensable gas, but because of the generally combustible nature of the solvents, it is preferable to use an inert gas, such as nitrogen. The inert gas or nitrogen is introduced into the treating cylinder before the treating solution is charged to the cylinder. In this manner, a cushion of inert gas is formed within the wood under the liquefied petroleum gas treating solution. When the injection phase of the treating cycle is over the compressed inert gas expands in the cells and forces a portion of the treating solution out of the wood. The quantity of solvent retained in the wood is thus lessened, and the time for liquefied petroleum gas recovery is also thus shorter. This empty cell method also permits the operator to vary the net retention of the toxic without changing the concentration of the toxic in the liquefied petroleum gas. Temperatures and pressures suitable for the process range up to 200° F., and corresponding pressures ranging up to 200 pounds per square inch. Otherwise, the only limitation on temperatures and pressures suitable for the process, are those limitations as restricted by standard wood treating specifications, such as those included in Federal Specification TT–W–571g.

More specifically, the present invention comprises the following series of steps as the best mode for commercially carrying out the main invention in a simple, economical, and practical way:

For full cell operation, the wood to be impregnated is enclosed in a hermetically sealed cylinder. The air in the cylinder is evacuated, that is, there is a purge to remove the oxygen to below 3 percent so as to avoid reaching the explosive range. This usually requires about 3 to 5 minutes. Vacuum is then pulled on the wood for the purpose of removing all non-condensable gas out of the cells of the wood so as to enable the penetration into the wood of as much preservative as possible. A solution containing the solvent, plus cosolvent, plus preservative, is introduced into the cylinder by first equalizing the pressure of the solvent gas, etc., and solution in a pressure storage tank with the vacuum in the treating cylinder. The cylinder is filled by gravity feed or pumping in additional preservative solution. The pressure is then raised by means of heat applied to the solution until the wood or other material is impregnated with the liquefied petroleum gas, etc. Additional solution may be pumped into the cylinder, if necessary, during processing.

When sufficient impregnant has been put into the wood, the liquid is returned from the cylinder to the pressure storage tank, utilizing the vapor pressure developed in the cylinder to effect the transfer. A vapor pump is used to remove the vapors in the cylinder. As the vapor pressure in the cylinder is reduced, solvent contained in the wood evaporates and these vapors are returned similarly to the storage tank. After the gases contained in the treated wood have been evaporated, condensed, and placed in the pressure storage tank, the treating cylinder is subjected to a vinal vacuum to remove last traces of hydrocarbons, then the cylinder is purged with inert gas to reduce hydrocarbon vapor to less than 4 percent. The cylinder is then opened and the wood removed.

For empty cell operation, using an incombustible gas, the wood is enclosed in a hermetically sealed cylinder, the air evacuated, and an inert gas, such as nitrogen, is introduced at a relatively low pressure, such as 50 pounds per square inch, and forced into the wood. On top of this gas, solution is impregnated into the wood, resulting in a cushion of inert gas under pressure within the wood and under the solution. When the impregnating cycle is ended, the liquid solvent is returned to the pressure storage tank.

The quantity of solvent retained in the wood during treatment is lessened, thus recovery is enacted more quickly, and the cylinder can be opened earlier. This empty cell method of treatment also allows the operator to vary the net retention of the toxic, etc., without changing the concentration of the toxic in the pentachlorophenol.

In addition to the general objects recited above, the invention has for other objects, such other improvements and advantages as may be found to obtain in the method and apparatus hereinafter described and claimed.

In the accompanying drawing forming a part of this specification, there is shown, for purposes of illustration, a flow diagram of the best mode of embodying and practicing the invention with pentachlorophenol.

Referring to the drawings:

*Preparation of treating solution.*—To provide the amount of pentachlorophenol required in liquefied petroleum gases (pentachlorophenol) for the treating solution, a cosolvent is used. Pentachlorophenol (penta) is received in bags (not shown) and dumped at 10 into the penta mix pot 11. Cosolvent is received in drums 12 which are connected by piping 13 to the liquid pump 14. Using this pump 14, the cosolvent is pumped from drums 12 through lines 13, 16 and the bypass line 17 around the penta mix pot 11 to the cosolvent-penta-mix tank 15. When a sufficient amount of cosolvent has been charged from drums 12 to the mix tank 15, the valves 18 on line 13 between the cosolvent drums 12 and the pump 14, are closed. The valve 19 in line 20 between the mix tank 15 and pump 14 is then opened, valve 21 in line 17 is closed, valves 22 and 23 in lines 24 and 25 are opened, and the cosolvent is circulated by line 20 from the mix tank 15 to the pump 14, and back to the mix tank 15 through lines 16 and 24 to the penta mix pot 11 and line 25 to the mix tank 15. The penta crystals in tank 11 are dissolved in this manner in the cosolvent from tank 15 until a 35–40 percent solution of penta in cosolvent is prepared. Pump 14 is then shut off and the valves 22, 21, 19 in line 24, 17 and 20 are closed. The solution of cosolvent-penta is then held in mix tank 15.

Solvent such as liquefied petroleum gas is received at 26 in tank trucks and unloaded with the truck's pump into the solvent storage tank 27 and the solvent penta storage tank 28. The final step in the preparation of the treating solution is the addition of the cosolvent penta solution from the mix tank 15 to the solvent from tanks 27, 28, to prepare a solution containing the necessary percentages of cosolvent, penta, and liquefied petroleum gas or solvent vehicle or formulation. A representative example for full cell operation would be 5 percent isopropyl ether, 3 percent penta, and 92 percent liquefied petroleum gas. A representative example for empty cell operation would be 8 percent isopropyl ether, 5 percent penta and 87 percent liquefied petroleum gas formulation. This is accomplished by introducing an inert gas, such as nitrogen, from line 29 to the mix tank 15, to increase its pressure to a point slightly in excess to the pressure in storage tank 28. Then valve 30 in line 31, and valve 32 in line 33, valve 36 in line 37, and valve 34 in line 35, are opened, and pump 14 is started. This will circulate the liquefied petroleum gas from the tank 28 to pump 14 and back through lines 35, 37, to tank 28. Next, the isopropyl ether penta mix from mix tank 15 is added into the suction side of pump 14 while the pump is circulating liquefied petroleum tank 28. To do this, the valve 19 in mix tank line 20 to the pump 14 is opened slightly. When the required amount of isopropyl ether-penta is added from mix tank 15, the valve 19 is closed. The liquid pump 14 continues to circulate the mix through tank 28 until a uniform mixture of liquefied petroleum gas penta solution is obtained, whereupon pump 14 is stopped, and valves 34, 36, 30 and 32 are closed.

A typical treating solution might be formulated, using 92 percent butane, 3 percent pentachlorophenol and 5 percent isopropyl ether.

The concentration of the pentachlorophenol in the treating solution can be varied, depending upon the retention desired or specified.

*Full cell treatment.*—The cylinder 38 is charged with wood and the cylinder door 39 is closed and sealed. All valves for the cylinder 38 are closed except the valve in line 40 betwen the cylinder 38 and the ejector 41. Next, the steam to the ejector 41 is turned on through line 42 and valve 43, and the cylinder 38 evacuated to 26 in. Hg vacuum. This will remove air from the cylinder 38 and the wood therein. Following an inert gas purge, the treating solution can be added to the cylinder. Valves 30 and 32 in lines 31 and 33 between the storage tank 28 and pump 14 are opened. Valves 44 in line 45 between line 16 from pump 14 and the treating cylinder 38 are opened. Pump 14 is started and the treating solution is charged to the cylinder 38. At the same time, the steam to the ejector 41 is shut off and the valve 40 in line 44 to the ejector is closed. Treating solution is added to the cylinder 38 until the wood charge is covered with treating solution. All valves 30, 32, 44, between tank 28, pump 14, and the treating cylinder 38 are then closed. The next step is to increase the pressure in the cylinder to about 150 p.s.i.g. This is accomplished by turning steam from line 45S and valve 46 into the coils 47 of the treating cylinder 38. The temperature of the solution is increased to 160° F., at which temperature the solution has a vapor pressure of about 150 p.s.i.g. The pressure in the cylinder 38 is controlled automatically by a recording pressure controller 48 which controls the steam flow to the heating coils 47 in the cylinder 38. This pressure is maintained for sufficient time, such as, two to three hours, to effect the impregnation of the wood 48 with the treating solution.

At the conclusion of the pressure cycle, the treating solution is transferred from the treating cylinder 38 to the solvent pentachlorophenol hold tank 49 rather than being returned to the solvent pentachlorophenol storage tank 28. This transfer is accomplished by opening valve 50 in line 51, between the cylinder 38 and the condenser cooler 52, and valve 53 in line 54, valve 55 in line 56, between the cooler 52 and the line 35 to the line 57 to the hold tank 49, as well as opening valve 58 in line 57. This transfer can be made without the use of the pump 14, since the pressure in the cylinder 38 will be about 100 p.s.i.g. greater than the pressure in the hold tank 49. As the liquid treating solution passes to the hold tank 49, it is cooled in the condenser cooler 52. This cooling reduces the vapor pressure and thereby aids the transfer. Any liquefied petroleum gas—pentachlorophenol treating solution remaining in the cylinder 38 at the conclusion of the liquid transfer will be transferred to the hold tank 49, using the liquid pump 14. At the conclusion of the liquid transfer, the steam line 45S to the cylinder 38 heating coils 47, and the valve 64 in line 54 between the cooler and hold tank is shut off. Considerable solvent remains in the cyilnder 38, some as a liquid in the wood, and the remaining as vapor around the wood. This solvent is recovered, using vapor pump 59. This vapor pump removes the solvent vapor from the cylinder and compresses it to 150 p.s.i.g. This is accomplished through opening valve 60 in the line 61. From the vapor pump 59, the compressed gas passes through line 62 and valves 63 and 69 to the condenser cooler 52. More, the condensable gases are passed through line 54 and valve 64 to collecting receiver 65. Non-condensable gases are vented through line 66 pressure controller 67 to the atmosphere. The condensed material collected in receiver 65 is released to the hold tank 49 through the liquid level controller 68 and lines 56, 35, and 57. As the pressure in the cylinder 38 is reduced by the operation of the vapor pump 59, the liquid solvent impregnated in the wood begins to vaporize and come out of the wood. This is accelerated by the fact that the wood, warmed during treatment by coils 47, supplies the heat necessary to vaporize the liquefied petroleum gas. When the vapor pump 59 no longer removes solvent in any quantity from the cylinder 38, the valves 60, 69 in line 61 and 62, are closed. Final traces of solvent in the cylinder are removed by ejector 41. The valve 40 in line 40 is opened and the steam in line 42 to the ejector 41, is turned on. A final vacuum of 26 in. of Hg will be maintained on the cylinder 38 for about ½ hr. This will remove any remaining liquefied petroleum gas. At the conclusion of the vacuum period, before the ejector 41 is turned off, the cylinder 38 is flushed with inert gas through line 70, from the inert gas receiver 72. This will completely flush out all final traces of solvent. The ejector 41 is then turned off and the vacuum is broken with inert gas from receiver 72. The cylinder door 39 is then opened and the wood removed.

The used treating solution, now in the solvent-pentachlorophenol hold tank 49, is now metered and analyzed. Pentachlorophenol content of this solution will be a check on the retention of the charge. Any water picked up in the treating cylinder or from the wood is decanted from the treating solution by way of the water drain valve 75 of the tank 49. The pentachlorophenol content is then adjusted to 3 percent by the addition of cosolvent pentachlorophenol solution from the cosolvent pentachlorophenol mix tank 15. Valve 73 in line 74, and valve 32, in the line 33 between the hold tank 49 and the liquid pump 44, are opened. Valves 34, 58 in lines 35 and 57 between the liquid pump 14 and the hold tank 49, are also opened. Pump 14 is then started and the solution circulated. The valve 19 in line 20 is then opened and the required amount of cosolvent pentachlorophenol is added from mix tank 15 to the system. The valve 19 in line 20 is then closed. The liquid pump 14 will continue to circulate the hold tank 49 until a uniform solution is obtained. Then the valve 58 in line 57 is closed and the valve 36 in line 37 is opened. In this manner, the adjusted treating solution is transferred to the solvent pentachlorophenol storage tank 28 and is now ready to treat the next charge.

*Empty cell treatment.*—The empty cell treatment is employed when it is desired to process wood in which a lower amount of preservative is to be retained in the wood and is identical to the full cell treatment except that after the initial vacuum the wood is pressured with inert gas at 20 to 30 p.s.i.g. Other gas pressures are used also, depending upon the final results desired. Without relieving this pressure from tank 72, the treating solution from storage tank 28 is introduced into the cylinder 38. After this, the treatment is identical with the full cell treatment above-described.

The following are examples of some of the actual tests made in accordance with the foregoing described process procedure:

EXAMPLE I

Southern yellow pine samples were treated with liquefied petroleum gas, isopropyl ether, pentachlorophenol solutions using the empty cell method. Treatment was carried out at 140–150 p.s.i.g. for approximately two (2) hours. These samples contained both sapwood and heartwood. There was no discernable swelling, warping, checking or distortion of the wood. The treated wood was clean and dry.

EXAMPLE II

Several 1-in. by 6-in. by 24-in. panels of southern yellow pine, sugar pine and Douglas fir were treated with a solution of 4 percent (wt.) pentachlorophenol in butane and vinyl ethyl ether cosolvent. Full cell treatment was employed. The pressure for treatment was obtained by increasing the temperature in the treating cylinder to 130° F. Pressure used was 150 p.s.i.g. All butane was removed from the wood in the treating cylinder. No apparent swelling, warping or grain raising was noticed. Penetrations were uniform.

EXAMPLE III

¾ in. by ¾ in. by 40-in. southern yellow pine field test saplings, and 2-in. by 4-in. by 48-in. samples of Douglas fir were treated in the same manner as Example II. Examination of the specimens showed uniform penetration with no apparent grain raising, swelling or checking.

EXAMPLE IV

A 1-in. by 1-in. by 9-in. piece of southern yellow pine was treated by the empty cell method with a 5-percent (wt.) pentachlorophenol in butane and methyl isobutyl ketone. Pressure of 162 p.s.i.g. held for 3 hours by heating the treating solution. When removed from cylinder the sample was clean and dry.

In operation, the process and apparatus is carried out in general the same as that described above in describing the flow on the drawings.

EXAMPLE V

A series of 6 specimens each of southern yellow pine, Douglas fir and red elm lumber, were treated with a 5 percent solution of pentachlorophenol in isobutane and ethyl ether cosolvent. The ethyl ether was contained in the total solution in 5 percent by weight. A full cell treating cycle consisting of three hours pressure at 75 p.s.i.g. was employed. The specimens thus treated were evaluated to determine the retention of pentachlorophenol. The results of this evalution are as follows:

Lbs. pentachlorophenol/c.f.
Pine _____ 1.86
Fir _____ .72
Elm _____ 1.33

EXAMPLE VI

Additional specimens of the pine, fir and elm used in Example V were treated with the preservative solution of Example V containing 0.5 part by weight of paraffin wax. After treatment, the wood specimens exhibited good surface water repellency.

EXAMPLE VII

A series of southern yellow pine, Douglas fir and red elm lumber, six of each specimen, were treated with a 5 percent solution of pentachlorophenol in isobutane and isopropyl ether cosolvent. The isopropyl ether was contained in the total solution in 8 percent by weight. A full celled treating cycle consisting of three hours pressure at 75 p.s.i.g. was employed. The specimens thus treated were evaluated to determine the retention of pentachlorophenol. The results of this evalution are as follows:

Lbs. pentachlorophenol/c.f.
Pine _____ .43
Fir _____ .50
Elm _____ 1.08

EXAMPLE VIII

A series of southern yellow pine, Douglas fir and and red elm lumber, six of each specimen, were treated with a 4 percent solution of pentachlorophenol in isobutane and vinyl ethyl ether cosolvent. The vinyl ethyl ether was contained in the total solution in 6 percent by weight. A full celled treating cycle consisting of three hours pressure at 75 p.s.i.g. was employed. The specimens thus treated were evaluated to determine the retention of pentachlorophenol. The results of this evaluation are as follows:

Lb. pentachlorophenol/c.f.
Pine _____ .46
Fir _____ .25
Elm _____ .60

EXAMPLE IX

A series of southern yellow pine, Douglas fir and red elm lumber, six of each specimen, were treated with a 5 percent solution of copper quinolinolate in isobutane and ethylene dichloride cosolvent. The ethylene dichloride was contained in the total solution in 5 percent by weight. A full celled treating cycle consisting of three hours pressure at 75 p.s.i.g. was employed. The specimens thus treated were evaluated to determine the retention of copper quinolinolate. The results of this evaluation are as follows:

Lb. copper/c.f.
Pine _____ .03
Fir _____ .04
Elm _____ .06

EXAMPLE X

A series of six specimens each southern yellow pine, Douglas fir and red elm lumber, were treated with a 5 percent solution of copper quinolinolate in isobutane and butyl chloride cosolvent. The butylchloride was contained in the total solution in 5 percent by weight. A full cell treating cycle consisting of three hours pressure at 75 p.s.i.g. was employed. The specimens thus treated were evaluated to determine the retention of copper quinolinolate. The results of this evaluation are as follows:

Lb. copper/c.f.
Pine _____ .03
Fir _____ .04
Elm _____ .05

EXAMPLE XI

A series of southern yellow pine, Douglas fir and red elm lumber, six of each specimen, were treated with a 5 percent solution of copper quinolinolate in isobutane and vinyl ethyl ether cosolvent. The vinyl ethyl ether was contained in the total solution in 5 percent by weight. A full celled treating cycle consisting of three hours pressure at 75 p.s.i.g. was employed. The specimens thus treated were evaluated to determine the retention of copper quinolinolate. The results of this evaluation are as follows:

Lb. copper/c.f.
Pine _____ .04
Fir _____ .04
Elm _____ .10

EXAMPLE XII

A specimen of southern yellow pine was treated with a 5 percent solution of copper quinolinolate in isobutane and methyl isobutyl ketone cosolvent. The methyl isobutyl ketone was contained in the total solution in 5 percent by weight. A full cell treating cycle consisting of three hours pressure at 75 p.s.i.g. was employed. The specimen thus treated was evaluated to determine the retention of copper quinolinolate. Copper retentions in excess of .04 lb./c.f. were obtained.

Several of the above species of wood, after impregnation with pentachlorophenol using the solvent-cosolvent technique of the present invention, were further subjected to tests to determine the effect of this treatment on the wood with respect to mold resistance, paintability and strength.

For example, elm was treated according to the procedure of Example I and subjected to the action of the common household molds. Untreated controls fostered mold growth; however, the elm samples treated with pentachlorophenol inhibited the growth of mold.

Also, several samples of Douglas fir and southern yellow pine were painted with one coat of primer and one coat of Sherwin Williams Outside White. Twenty-four hours after removal of the samples from the treating cylinders, staining or blistering did not occur. The species were then placed on weathering racks. After 24 months of outdoor exposure, the paint film is still in excellent condition and without blistering or staining.

The strength of wood treated in accordance with this invention has been tested and the results show that there is no significant difference in strength between treated and untreated samples of the same sections of wood. To obtain the results of strength tests conducted on treated and untreated wood, the procedure was as follows: matched samples of southern yellow pine were selected and cut into toughness test and shear test specimens. The toughness specimens were ⅝" x ⅝" x 10" and the shear specimens were 2" x 2" x 2½". One-half of each group were designated to be untreated controls while the remainder were treated with a solution of 3.3% pentachlorophenol in liquefied petroleum gas and diethyl ether. Following an initial vacuum of ½ hour, a pressure period of 150 p.s.i.g. was maintained for one (1) hour. Final vacuum was ½ hour.

The approximate pentachlorophenol retention of the test blocks was 0.45 lb. of pnetachlorophenol per cubic foot. Average results are as follows:

*Table I*

|  | No. specimens | Strength value | |
|---|---|---|---|
|  |  | Untreated | Treated |
| Shear test | 22 | [1] 1750 | [1] 1715 |
| Toughness test | 38 | [2] 79 | [2] 86 |

[1] P.s.i.
[2] In. lbs.

The shear test was repeated using Black gum. The treatment was carried out as outlined above except that a pressure period of 1½ hours was used. The average results of the test specimens is as follows:

*Table II*

|  | No. specimens | Strength value | |
|---|---|---|---|
|  |  | Untreated | Treated |
| Shear test | 30 | [1] 1689 | [1] 1790 |

[1] P.s.i.

The foregoing has presented a novel process for impregnating wood with pentachlorophenol using solvent vehicles that are normally gaseous at operating temperatures and atmospheric pressure and that are readily liquefiable at operating temperatures under elevated pressure above atmospheric in combination with cosolvent vehicles that have less than 10% water solubility, greater than 25% solubility for the pentachlorophenol to be dissolved therein and a solubility in the solvent used as the primary carrier for the preservative. Using this novel method, wood may be impregnated with pentachlorophenol without changing the dimensions of the wood, without changing the surface texture of the wood, while simultaneously allowing for immediate and lasting paintability of the wood so treated.

What is claimed is:

1. In a process for the impregnation of wood, the steps comprising enclosing the wood in a hermetically sealable treating cylinder; evacuating air from the cylinder after sealing thereof; equalizing the pressure between said cylinder and a pressure storage tank containing a solution of a liquefied aliphatic hydrocarbon selected from the class consisting of propane, n-butane, isobutane, n-pentane, isopentane, and mixtures thereof, and containing pentachlorophenol in combination with at least about two percent based on said solution of a cosolvent, differing in its molecular structure from said liquefied aliphatic hydrocarbon, having less than 10% water solubility, greater than 25% solubility for the pentachlorophenol and a solubility in said aliphatic hydrocarbon, whereby said solution contains at least 2% pentachlorophenol, and thereafter introducing the aliphatic hydrocarbon and cosolvent having the pentachlorophenol in the cosolvent from the storage tank into the cylinder until it is substantially full; heating the solution and thereby raising the vapor pressure and maintaining the raised pressure on the solution until the wood is impregnated with said solution; after the wood is impregnated, removing the solution from the cylinder to a storage tank and thereafter evacuating residual gases from the treating cylinder and wood therein, condensing the vapors and storing the condensate in the storage hold tank; ejecting residual vapors to the atmosphere from and creating vacuum in the cylinder with the wood still therein, and thereafter flushing the cylinder with the wood therein with inert gas before discontinuing the ejecting action; discontinuing the ejecting and breaking the vacuum in the cylinder with inert gas and thereafter unsealing the cylinder and removing the wood therefrom.

2. Process as claimed in claim 1, and in which the liquid removed from the cylinder to the storage tank is first returned to a storage hold tank where it is denuded of water, and thereafter its concentration of impregnant adjusted and the adjusted solution returned to the storage tank for re-use in a next treatment.

3. A process for the impregnation of wood with a liquefied preservative while concurrently retaining in the wood original dimensions and surface texture yet retaining sufficient preservative in the wood to preserve the wood, comprising immersing at pressures above ambient the wood in a solution of a preservative selected from the class consisting of cooper quinolinolate and pentachlorophenol in an aliphatic hydrocarbon which is in a liquid state and which is selected from the class consisting of propane, n-butane, isobutane, n-pentane, isopentane, and mixtures thereof, said solvent containing additionally at least about two percent based on said solution of a cosolvent to assist said preservative into solution, said cosolvent being selected from the group consisting of benzene, nitrobenzene, di- and tri-chlorobenzenes, alkyl benzenes, hydroxy benzenes, ethyl ether, isopropyl ether, vinyl ethyl ether, dibutyl ether, dibutyl ketone, diisobutyl ketone, methylisobutyl ketone, benzonitrile, Decalin, tetralin, butyraldehyde, and isobutyraldehyde.

4. A process for the impregnation of wood with a liquefied preservative while concurrently retaining in the wood original dimensions and surface texture comprising immersing at pressures above ambient, the wood in a solution of preservative selected from the class consisting of copper quinolinolate and pentachlorophenol in an aliphatic hydrocarbon which is in a liquid state and which is selected from the class consisting of propane, n-butane, isobutane, n-pentane, isopentane and mixtures thereof, said solvent containing additionally a cosolvent to assist said preservative into solution, said cosolvent being selected from the group consisting of benzene, nitrobenzene, di- and tri-chlorobenzene, alkyl benzene, hydroxy benzene, ethyl ether, isopropyl ether, vinyl ethyl ether, dibutyl ether, dibutyl ketone, diisobutyl ketone, methyl isobutyl ketone, benzonitrile, Decalin, tetralin, butyraldehyde and isobutyraldehyde, wherein said preservative is in solution in said hydrocarbon and cosolvent in an amount of from two to about six percent and said cosolvent comprises from about two to about eight percent of said solution.

5. A process for the impregnation of wood with a liquid preservative while concurrently retaining the original dimensions and surface texture of the wood comprising:
(A) immersing the wood in a solution at pressures above ambient,
  (1) said solution comprising
    (a) a hydrocarbon which is selected from the class consisting of propane, n-butane, isobutane, n-pentane, isopentane, and mixtures thereof and which is in the liquid state,
    (b) a preservative selected from the class consisting of copper quinolinolate and pentachlorophenol, and
    (c) a cosolvent, differing in its molecular structure from said hydrocarbon, that has less than 10% water solubility, that has at least 25% solubility for the preservative, and that is soluble in the hydrocarbon to form a solution containing at least 2% by weight preservative, said solution containing at least 2% by weight of said cosolvent.
(B) separating said solution from the wood, and
(C) evaporating the hydrocarbon from the wood autogenously whereby the preservative remains in the wood.

6. A process according to claim 5 in which said preservative is in solution in said aliphatic hydrocarbon and said cosolvent in an amount of from about two to about six percent, and the impregnation is carried out at an elevated temperature not above 200° F. and a superatmospheric pressure not above 200 p.s.i.g.

7. A process according to claim 6 in which said cosolvent used in said solution comprises from about two to about eight percent of said total solution.

8. A process for preserving wood comprising:
(A) dissolving pentachlorophenol in
  (1) a hydrocarbon which is in the liquid state and which is selected from the class consisting of propane, n-butane, isobutane, n-pentane, isopentane, and mixtures thereof, and
  (2) a cosolvent differing in its molecular structure from said hydrocarbon
    (a) that has less than 10% water solubility,
    (b) that has at least 25% solubility for pentachlorophenol,
    (c) that is soluble in the hydrocarbon to form a solution containing at least 2% pentachlorophenol, and
    (d) that is present in an amount of at least about two percent based on said solution,
(B) impregnating wood with said solution, and
(C) evaporating the hydrocarbon from the wood autogenously whereby pentachlorophenol remains in the wood to preserve the wood.

9. A process according to claim 8 in which said cosolvent is isopropyl ether.

10. A process according to claim 8 in which said aliphatic hydrocarbon is liquefied petroleum gas.

11. A process according to claim 8 in which said solution comprises from about two to six percent of pentachlorophenol in said aliphatic hydrocarbon and said cosolvent, and the impregnation is carried out at an elevated temperature not above 200° F. and a superatmospheric pressure not above 200 p.s.i.g.

12. A process according to claim 11 in which said cosolvent used in said solution comprises from about two to about eight percent of said total solution.

13. A solution for impregnating wood to preserve the wood comprising:
(A) pentachlorophenol dissolved in
  (1) a hydrocarbon which is in the liquid state and is selected from the class consisting of propane, n-butane, isobutane, n-pentane, isopentane and mixtures thereof, and
  (2) a cosolvent differing in its molecular structure from said hydrocarbon
    (a) that has less than 10% water solubility,
    (b) that has at least 25% solubility for the preservative, and
    (c) that is soluble in the hydrocarbon,
said solution containing at least 2% of pentachlorophenol and at least about two percent cosolvent.

14. A solution for impregnating wood to preserve the wood comprising:
(A) a solution of pentachlorophenol in a solvent that is
  (1) a hydrocarbon which is in the liquid state and is selected from the class consisting of propane, n-butane, isobutane, n-pentane, isopentane, and mixtures thereof, and
  (2) a cosolvent that is selected from the class consisting of benzene, nitrobenzene, di- and trichlorobenzene, alkyl benzene, hydroxy benzene, ethyl ether, isopropyl ether, vinyl ethyl ether, dibutyl ether, dibutyl ketone, diisobutyl ketone, methyl isobutyl ketone, benzonitrile Decalin, tetralin, butyraldehyde and isobutyraldehyde,
said solution containing 2–8% of cosolvent and at least 2% of pentachlorophenol.

References Cited by the Examiner

UNITED STATES PATENTS

| | | | |
|---|---|---|---|
| 2,135,029 | 11/38 | Boller | 117—59 |
| 2,209,970 | 8/40 | Hay | 117—147 |
| 2,273,039 | 2/42 | Hudson | 117—57 |
| 2,860,070 | 11/58 | McDonald | 117—59 |

FOREIGN PATENTS 694,734  7/53  Great Britain.

OTHER REFERENCES

"Wood Preservation During the Last Fifty Years," Van Groenow, 1951, Holland, pp. 179–185.

WILLIAM D. MARTIN, *Primary Examiner.*

MURRAY KATZ, *Examiner.*